United States Patent
Choi et al.

(10) Patent No.: US 10,604,597 B2
(45) Date of Patent: Mar. 31, 2020

(54) POLYPROPYLENE

(71) Applicant: LG Chem, Ltd., Seoul (KR)

(72) Inventors: Ji Ho Choi, Daejeon (KR); In Yong Jung, Daejeon (KR); Kyung Seop Noh, Daejeon (KR); Won-Sang Lee, Daejeon (KR); Sang Jin Jeon, Daejeon (KR); Sang Eun An, Daejeon (KR); Sang Hoon Lee, Daejeon (KR)

(73) Assignee: LG Chem, Ltd. (KR)

( * ) Notice: Subject to any disclaimer, the term of this patent is extended or adjusted under 35 U.S.C. 154(b) by 91 days.

(21) Appl. No.: 15/765,762

(22) PCT Filed: Feb. 13, 2017

(86) PCT No.: PCT/KR2017/001550
§ 371 (c)(1),
(2) Date: Apr. 4, 2018

(87) PCT Pub. No.: WO2017/159994
PCT Pub. Date: Sep. 21, 2017

(65) Prior Publication Data
US 2018/0298122 A1 Oct. 18, 2018

(30) Foreign Application Priority Data

Mar. 18, 2016 (KR) .................. 10-2016-0032962
Feb. 10, 2017 (KR) .................. 10-2017-0018677

(51) Int. Cl.
| | | |
|---|---|---|
| C08F 110/06 | (2006.01) | |
| C08F 4/653 | (2006.01) | |
| C08F 4/6592 | (2006.01) | |
| C08L 23/12 | (2006.01) | |
| C08F 10/06 | (2006.01) | |
| C08F 4/648 | (2006.01) | |
| C08F 4/659 | (2006.01) | |

(52) U.S. Cl.
CPC .......... *C08F 10/06* (2013.01); *C08F 4/648* (2013.01); *C08F 110/06* (2013.01); *C08L 23/12* (2013.01); *C08F 4/65908* (2013.01); *C08F 4/65912* (2013.01); *C08F 4/65916* (2013.01); *C08F 4/65927* (2013.01); *C08F 2500/04* (2013.01); *C08F 2500/12* (2013.01)

(58) Field of Classification Search
CPC ..... C08F 10/06; C08F 210/06; C08F 4/65927
See application file for complete search history.

(56) References Cited

U.S. PATENT DOCUMENTS

| | | |
|---|---|---|
| 6,350,830 B1 | 2/2002 | Gores et al. |
| 2005/0288472 A1 | 12/2005 | Maziers et al. |
| 2011/0034634 A1 | 2/2011 | Grein et al. |
| 2011/0054110 A1 | 3/2011 | Ter Woort et al. |
| 2011/0065873 A1 | 3/2011 | Grein et al. |
| 2012/0123013 A1 | 5/2012 | Ek et al. |
| 2012/0329966 A1 | 12/2012 | Kwon et al. |
| 2015/0073107 A1 | 3/2015 | Choi et al. |
| 2016/0355628 A1 | 12/2016 | Yoshimoto et al. |

FOREIGN PATENT DOCUMENTS

| | | |
|---|---|---|
| EP | 1849827 A1 | 10/2007 |
| EP | 2028122 A1 | 2/2009 |
| EP | 2108679 A1 | 10/2009 |
| JP | 4928742 B2 | 5/2012 |
| KR | 100987085 B1 | 10/2010 |
| KR | 20110117736 A | 10/2011 |
| KR | 101164041 B1 | 7/2012 |
| KR | 20120096875 A | 8/2012 |
| KR | 20130125311 A | 11/2013 |
| KR | 101440217 B1 | 9/2014 |
| KR | 20150052803 A | 5/2015 |
| KR | 20150052804 A | 5/2015 |
| KR | 20150063885 A | 6/2015 |
| KR | 20160057930 A | 5/2016 |
| KR | 101737568 B1 | 5/2017 |
| KR | 20170094671 A | 8/2017 |
| KR | 20170096862 A | 8/2017 |
| WO | 2010009827 A1 | 1/2010 |
| WO | 2015125802 A1 | 8/2015 |

OTHER PUBLICATIONS

Extended European Search Report for Application No. EP17766895.1 dated Aug. 30, 2018.
International Search Report for Application No. PCT/KR2017/001550 dated May 29, 2017.

*Primary Examiner* — Caixia Lu
(74) *Attorney, Agent, or Firm* — Lerner, David, Littenberg, Krumholz & Mentlik, LLP

(57) ABSTRACT

The present invention relates to a polypropylene which exhibits high transparency and has a very low level of generation of volatile organic compounds, which has a total volatile organic compounds (TVOC) value of 60 μg/g or less, which is measured according to VDA 277 standardized by the German Automobile Industry Association by heating the polypropylene for 12 to 5 hours and converting all hydrocarbons detected per 1 g into an acetone content, and a haze value of 5% or less.

9 Claims, No Drawings

POLYPROPYLENE

CROSS-REFERENCE TO RELATED APPLICATION(S)

This application is a national phase entry under 35 U.S.C. § 371 of International Application No. PCT/KR2017/001550, filed Feb. 13, 2017, which claims priority to Korean Patent Application No. 10-2016-0032962, filed Mar. 18, 2016 and Korean Patent Application No. 10-2017-0018677, filed Feb. 10, 2017, the disclosures of which are incorporated herein by reference.

(a) FIELD OF THE INVENTION

The present invention relates to a polypropylene which exhibits high transparency and has a very low level of generation of volatile organic compounds.

(b) DESCRIPTION OF THE RELATED ART

Olefin polymerization catalyst systems can be classified into Ziegler-Natta and metallocene catalyst systems, and these two highly active catalyst systems have been developed in compliance with their characteristics. Ziegler-Natta catalyst has been widely applied to existing commercial processes since it was developed in the 1950's. However, since the Ziegler-Natta catalyst is a multi-active site catalyst in which a plurality of active sites are mixed, it has a feature that molecular weight distribution of polymers is broad. Also, since compositional distribution of comonomers is not uniform, there is a problem that it has a limitation in securing the desired physical properties.

The metallocence catalyst consist of a combination of a main catalyst whose main component is a transition metal compound, and an organometallic compound cocatalyst whose main component is aluminium. Such a catalyst is a single-site catalyst which is a homogeneous complex catalyst, and offers a polymer having a narrow molecular weight distribution and a uniform composition distribution of comonomers, depending on the single site characteristics. The metallocence catalyst has characteristics capable of changing the stereoregularity, copolymerization properties, molecular weight, degree of crystallinity and the like of the polymer by changing the ligand structure of the catalyst and the polymerization condition.

Meanwhile, an ansa-metallocene compound is an organometallic compound including two ligands which are connected to each other by a bridge group, wherein the bridge group prevents the rotation of the ligand and determines the activity and structure of the metal center.

Such ansa-metallocene compound is being used as a catalyst for preparing an olefinic homopolymer or copolymer. Particularly, it is known that by using the ansa-metallocene compound including a cyclopentadienyl-fluorenyl ligand, a high molecular weight polyethylene can be prepared, and thereby the microstructure of a polypropylene can be controlled. Furthermore, it is known that the ansa-metallocene compound having an indenyl ligand has excellent activity and can be used to prepare a polyolefin having an enhanced stereoregularity.

On the other hand, in order to use olefinic polymers, especially polypropylene, in cosmetics, food containers and the like, high transparency and low level of generation of volatile organic compounds are required. In the case of using conventional Ziegler-Natta catalysts, it was difficult to produce polypropylene having such characteristics with high productivity and yield.

SUMMARY OF THE INVENTION

In view of the above, the present inventors have found that by using a metallocene catalyst having a specific structure instead of a Ziegler-Natta catalyst, polypropylene exhibiting high transparency and a very low level of generation of volatile organic compounds can be produced, thereby completing the present invention.

The present invention provides a polypropylene having a TVOC (total volatile organic compounds) value of 60 µg/g or less, which is measured according to VDA 277 standardized by the German Association of the Automobile Industry and means a value obtained by heating the polypropylene at 120° C. for 5 hours and converting hydrocarbons detected per 1 g of the polypropylene into the content of acetone; and having a haze of 5% or less.

Hereinafter, the polypropylene according to a specific embodiment of the present invention will be described in more detail.

As used herein, the term "polypropylene" means a propylene homopolymer or a propylene/ethylene copolymer which is produced by polymerizing propylene. Also, the "polypropylene" produced in the present invention is produced by performing polymerization in the presence of a metallocene catalyst to be described later, and is characterized in that a molecular weight distribution (Mw/Mn) is 3.5 or less, or 1.5 to 3.5, or 2.5 to 3.5. Generally, a polypropylene produced with a Ziegler-Natta catalyst exhibits a broad molecular weight distribution, and thus can be distinguished from polypropylene produced with a Ziegler-Natta catalyst according to the above-mentioned molecular weight distribution.

The polypropylene of one embodiment may exhibit very low amount of volatile organic compound emission.

The amount of volatile organic compound emission is measured in order to confirm the content of volatile organic compounds emitted under a predetermined condition (temperature, time, etc.), and can be measured according to VDA277 and VDA278 standardized by the German Association of the Automobile Industry. As used herein, the "amount of volatile organic compound emission" refers to the total sum of a TVOC value measured according to VDA 277, and VOC and FOG values measured according to VDA 278.

More specifically, the amount of volatile organic compound emission can be divided into TVOC (total volatile organic compounds) and VOC/FOG (volatile organic compounds/fogging).

The TVOC (total volatile organic compounds) is measured according to VDA277 standardized by the German Association of the Automobile Industry, and means a value obtained by heating an olefin polymer at 120° C. for 5 hours and converting all hydrocarbons detected per 1 g of the olefin polymer into the content of acetone.

The VOC (volatile organic compounds) is measured according to VDA278 standardized by the German Association of the Automobile Industry, and means a value obtained by heating an olefin polymer at 90° C. for 30 minutes and converting straight chain hydrocarbons having 1 to 25 carbon atoms detected per 1 g of the olefin polymer into the content of toluene. FOG (fogging) is measured according to VDA278 standardized by the German Association of the Automobile Industry, and means a value obtained by heating an olefin polymer at 120° C. for 1 hour and converting straight chain hydrocarbons having 14 to 32 carbon atoms detected per 1 g of the olefin polymer into the content of hexadecane.

Polypropylene produced using the existing Ziegler-Natta catalyst has a high volatile organic compound emission, making it difficult to apply to automobile interior materials, household electrical appliances, and the like. However, the polypropylene according to an embodiment of the present invention has remarkably reduced volatile organic compound emission, exhibits a very low volatile organic compound emission at a high temperature, and thus significantly reduces harmfulness to human body, and it can be conveniently used for automobile interior materials, household electrical appliances, and the like.

More specifically, the polypropylene according to one embodiment of the present invention may have a TVOC value of 60 μg/g or less, or 50 μg/g or less, or 40 μg/g or less, or 35 μg/g or less, which is a value obtained by heating an polypropylene at 120° C. for 5 hours and converting hydrocarbons detected per 1 g of the polypropylene into the content of acetone according to VDA 277. As the TVOC value is lower, it is more advantageous. Thus, the lower limit may be 0 μg/g or more, or 1 μg/g or more, or 10 μg/g or more.

The TVOC value according to VDA 277 can be measured using headspace-GC (gas chromatography)-FID (flame-ionization detector).

Further, the polypropylene according to one embodiment of the present invention may have a VOC (volatile organic compounds) value of 30 μg/g or less, or 25 μg/g or less, or 20 μg/g or less, which is a value obtained by heating an polypropylene at 90° C. for 30 minutes and converting straight chain hydrocarbons having 1 to 25 carbon atoms detected per 1 g of the polypropylene into the content of toluene according to VDA 278. As the VOC value is lower, it is more advantageous. Thus, the lower limit may be 0 μg/g or more, or 1 μg/g or more, or 10 μg/g or more.

Further, the polypropylene according to one embodiment may have a FOG (fogging) value of 40 μg/g or less, or 35 μg/g or less, or 30 μg/g or less, or 25 μg/g or less, which is a value obtained by heating an polypropylene at 120° C. for 1 hour and converting straight chain hydrocarbons having 14 to 32 carbon atoms detected per 1 g of the polypropylene into the content of hexadecane according to VDA 278. As the FOG value is lower, it is more advantageous. Thus, the lower limit may be 0 μg/g or more, or 1 μg/g or more, or 10 μg/g or more.

The VOC and FOG values according to VDA278 can be measured using purge & trap-GC (gas chromatography)-MSD (mass selective detector).

The polypropylene according to an embodiment of the present invention may have the amount of the volatile organic compound emission, that is, the total sum of TVOC, VOC, and FOG of 500 μg/g or less, or 300 μg/g or less, or 200 μg/g or less, or 100 μg/g or less. As the amount of the volatile organic compound emission is lower, it is advantageous. Thus, the lower limit may be 0 μg/g or more, or 10 μg/g or more, or 50 μg/g or more.

As described later, the polypropylene of one embodiment is produced in the presence of a hybrid supported catalyst including two types of metallocene compounds containing a specific transition metal, and thus has a remarkably low volatile organic compound emission as compared with a polymer produced using a conventional Ziegler-Natta catalyst. Therefore, it can be usefully applied to products such as injection containers or beverage cups which can make direct contact with a human body.

In addition, the polypropylene of the embodiment exhibits a haze of 5% or less, preferably 4.8% or less. The polypropylene having such a low haze value is excellent in transparency and thus can be easily applied to injection products such as cosmetics and food containers.

Further, the polypropylene may have a flexural strength (measured according to ASTM D790) of 400 kgf/cm² or more, preferably 410 kgf/cm² to 600 kgf/cm², more preferably 420 to 500 kgf/cm².

Further, the polypropylene may have a melting point (Tm) of 130° C. to 145° C., preferably 140° C. to 145° C., and a flexural modulus (measured according to ASTM D790) of 14,000 kgf/cm² or more, preferably 14,500 kgf/cm² or more, more preferably 15,000 kgf/cm² to 20,000 kgf/cm². That is, despite having such a low melting point, the polypropylene shows that a flexural modulus is as high as 14,000 kgf/cm² or more, which has an advantage of saving energy during polypropylene processing.

Further, the polypropylene of one embodiment may have a MFR (measured at 230° C. under a load of 2.16 kg according to ASTM D1238) of 10 to 25 g/10 min. In order to produce a polypropylene having an MFR value within such a range, when a Ziegler-Natta catalyst is used, a high content of hydrogen must be introduced in the polymerization step. However, when a hybrid supported catalyst including two types of metallocene compounds containing a specific transition metal is used as described later, it is possible to introduce a relatively low amount of hydrogen, so that the activity control is easy and the process stability is enhanced.

Moreover, the polypropylene may have a tensile strength (measured according to ASTM D790) of 300 to 400 kgf/cm².

The polypropylene of one embodiment may have a weight average molecular weight of 100,000 to 500,000 g/mol, and preferably 100,000 to 200,000 g/mol.

Meanwhile, the polypropylene of one embodiment can be produced by polymerizing propylene in the presence of a hybrid supported catalyst comprising a compound represented by the following Chemical Formula 1, a compound represented by the following Chemical Formula 2 and a support:

[Chemical Formula 1]

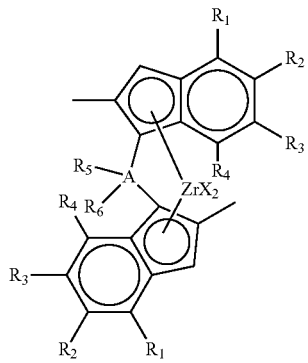

in Chemical Formula 1,

X is halogen, equal to or different from each other,

R₁ is $C_{6-20}$ aryl substituted with $C_{1-20}$ alkyl,

R₂, R₃ and R₄ are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silyl ether, $C_{1-20}$ alkoxy, $C_{6-20}$ aryl, $C_{7-20}$ alkylaryl, or $C_{7-20}$ arylalkyl, A is carbon, silicon or germanium,
$R_5$ is $C_{1-20}$ alkyl substituted with $C_{1-20}$ alkoxy, and
$R_6$ is hydrogen, $C_{1-20}$ alkyl or $C_{2-20}$ alkenyl,

[Chemical Formula 2]

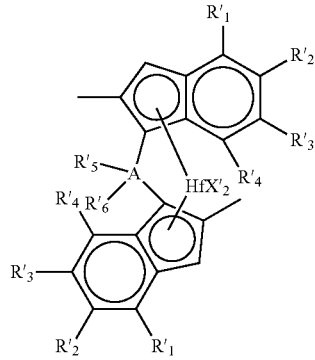

in Chemical Formula 2,
X' is halogen, equal to or different from each other,
$R'_1$ is $C_{6-20}$ aryl substituted with $C_{1-20}$ alkyl,
$R'_2$, $R'_3$ and $R'_4$ are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silyl ether, $C_{1-20}$ alkoxy, $C_{6-20}$ aryl, $C_{7-20}$ alkylaryl, or $C_{7-20}$ arylalkyl,
A' is carbon, silicon or germanium,
$R'_5$ is $C_{1-20}$ alkyl substituted with $C_{1-20}$ alkoxy, and
$R'_6$ is hydrogen, $C_{1-20}$ alkyl or $C_{2-20}$ alkenyl.

In the hybrid supported catalyst, the molar ratio between the compound represented by Chemical Formula 1 and the compound represented by Chemical Formula 2 is preferably 2:1 to 1:5. Within the above molar ratio, the optimum catalytic activity and physical properties can be exhibited, which can be advantageous in view of in terms of the maintenance of the catalytic activity and the economic efficiency.

In Chemical Formula 1, preferably, $R_1$ is phenyl substituted with tert-butyl. More preferably, $R_1$ is 4-tert-butyl-phenyl.

Further, preferably, $R_2$, $R_3$ and $R_4$ are hydrogen.
Further, preferably, A is silicon.
Further, preferably, $R_5$ is 6-tert-butoxy-hexyl and $R_6$ is methyl.

Representative examples of the compound represented by Chemical Formula 1 are as follows:

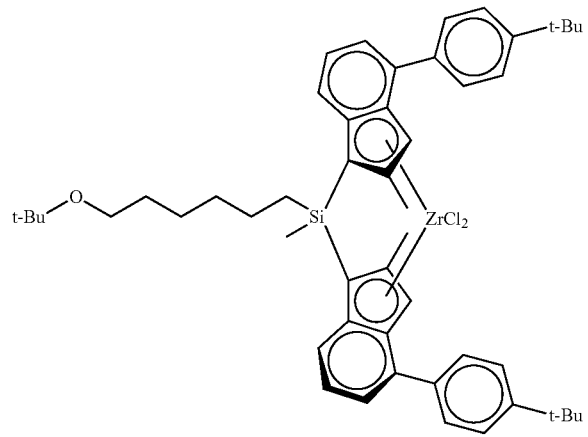

The compound represented by Chemical Formula 1 may be prepared according to the following Reaction Scheme 1:

[Reaction Scheme 1]

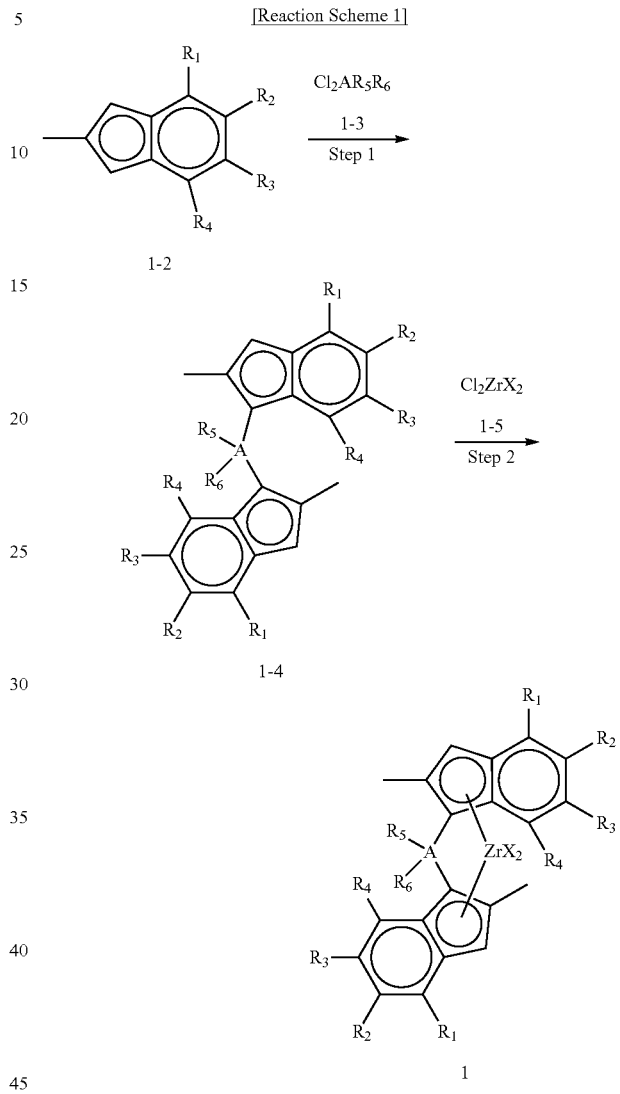

Step 1 is a step of reacting a compound represented by Chemical Formula 1-2 with a compound represented by Chemical Formula 1-3 to prepare a compound represented by Chemical Formula 1-4. Alkyllithium (for example, n-butyllithium) is used preferably used in the reaction, and the reaction temperature is −200 to 0° C., more preferably −150 to 0° C. Toluene, THF and the like can be used as the solvent. In this case, after separating the organic layer from the product, a step of vacuum drying the separated organic layer and removing excess reactant can be further performed.

Step 2 is a step of reacting a compound represented by Chemical Formula 1-4 with a compound represented by Chemical Formula 1-5 to prepare a compound represented by Chemical Formula 1. Alkyllithium (for example, n-butyllithium) is preferably used in the reaction, and the reaction temperature is −200 to 0° C., more preferably −150 to 0° C. Ether, hexane and the like can be used as the solvent.

Further, in Chemical Formula 2, preferably, $R'_1$ is phenyl substituted with tert-butyl. More preferably, $R'_1$ is 4-tert-butyl-phenyl.

Further, preferably, $R'_2$, $R'_3$ and $R'_4$ are hydrogen.

Further, preferably, A' is silicon.

Further, preferably, $R'_5$ is 6-tert-butoxy-hexyl, and $R'_6$ is methyl.

Representative examples of the compound represented by Chemical Formula 2 are as follows:

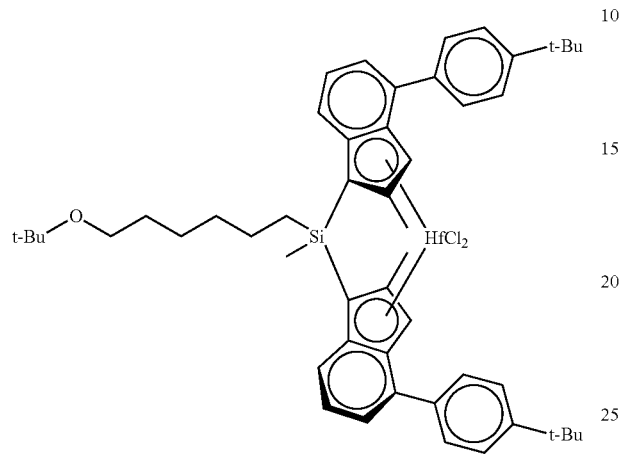

The compound represented by Chemical Formula 2 may be prepared according to the following Reaction Scheme 2:

[Reaction Scheme 2]

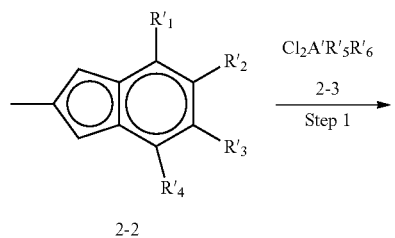

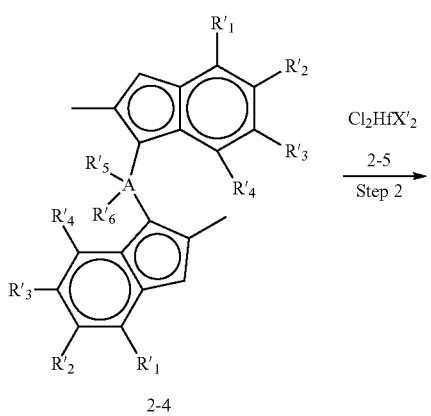

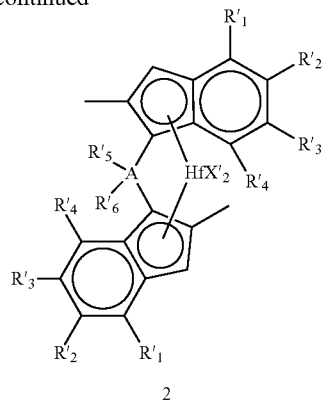

Step 1 is a step of reacting a compound represented by Chemical Formula 2-2 with a compound represented by Chemical Formula 2-3 to prepare a compound represented by Chemical Formula 2-4. Alkyllithium (for example, n-butyllithium) is preferably used in the reaction, and the reaction temperature is −200 to 0° C., more preferably −150 to 0° C. Toluene, THF and the like can be used as the solvent. In this case, after separating the organic layer from the product, a step of vacuum drying the separated organic layer and removing excess reactant can be further performed.

Step 2 is a step of reacting a compound represented by Chemical Formula 2-4 with a compound represented by Chemical Formula 2-5 to prepare a compound represented by Chemical Formula 2. Alkyllithium (for example, n-butyllithium) is preferably used for the reaction, and the reaction temperature is −200 to 0° C., more preferably −150 to 0° C. Ether, hexane and the like can be used as the solvent.

Meanwhile, in Chemical Formulas 1 and 2, preferably, X and X', $R_1$ and $R'_1$, $R_2$ and $R'_2$, $R_3$ and $R'_3$, $R_4$ and $R'_4$, A and A', $R_5$ and $R'_5$, and $R_6$ and $R'_6$ are equal to or different from each other. That is, it is desirable that only metal atom has a different structure in the compound represented by Chemical Formula 1 and the compound represented by Chemical Formula 2.

In the hybrid support catalyst of one embodiment, a support containing a hydroxy group on the surface can be used as the support, and preferably, a support containing a hydroxy group and a siloxane group having high reactivity, which is dried to remove moisture on its surface, can be used. For example, silica, silica-alumina and silica-magnesia, and the like, which are dried at high temperature, may be used, and they may usually contain oxides, carbonates, sulfates, and nitrate components such as $Na_2O$, $K_2CO_3$, $BaSO_4$, and $Mg(NO_3)_2$.

The drying temperature of the support is preferably 200 to 800° C., more preferably 300 to 600° C., and most preferably 300 to 400° C. If the drying temperature of the support is lower than 200° C., it retains moisture too much so that moisture on the surface is reacted with the cocatalyst. If the drying temperature is higher than 800° C., pores on the surface of the support are combined with each other to reduce surface area, and many hydroxyl groups are lost on the surface to remain only siloxane groups. Thus, since the reactive sites with cocatalyst are reduced, it is not preferable.

The amount of hydroxyl group on the surface of the support is preferably 0.1 to 10 mmol/g, and more preferably 0.5 to 5 mmol/g. The amount of hydroxyl group on the surface of the support may be controlled depending on the preparation method and conditions of the support, or drying conditions such as temperature, time, vacuum, spray drying, and the like.

If the amount of hydroxyl group is less than 0.1 mmol/g, the reactive sites with cocatalyst are reduced. If the amount of hydroxyl group is more than 10 mmol/g, it is not desirable because it may be caused by moisture besides the hydroxyl groups present on the surface of support particles.

Further, in the hybrid supported catalyst, the mass ratio of the catalyst (the compound represented by Chemical Formula 1 and the compound represented by Chemical Formula 2 to the support is preferably 1:1 to 1:1000. When the carrier and the catalyst are contained at the above mass ratio, they may exhibit proper supported catalyst activity, which may be advantageous in terms of the maintenance of the catalytic activity and the economic efficiency.

The hybrid supported catalyst may further include a cocatalyst in addition to the compound represented by Chemical Formula (1), the compound represented by Chemical Formula 2 and the support. The cocatalyst may further include at least one of the cocatalyst compounds represented by the following Chemical Formulas 3, 4 and 5.

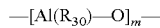  [Chemical Formula 3]

in Chemical Formula 3 above, $R_{30}$ may be equal to or different from each other, and each independently represent a halogen; a hydrocarbonyl having 1 to 20 carbon atoms; or a hydrocarbonyl having 1 to 20 carbon atoms substituted with halogen; and m is an integer of 2 or more;

  [Chemical Formula 4]

in Chemical Formula 4 above,
$R_{31}$ is as $R_{30}$ defined in Chemical Formula 3;
J is aluminum or boron;

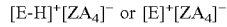  [Chemical Formula 5]

in Chemical Formula 5 above,
E is a neutral or cationic Lewis base;
H is a hydrogen atom;
Z is a Group 13 element; and
A may be equal to or different from each other, and each independently represent an aryl group having 6 to 20 carbon atoms or an alkyl group having 1 to 20 carbon atoms, in which one or more hydrogen atoms are substituted or unsubstituted with a halogen, a hydrocarbonyl having 1 to 20 carbon atoms, an alkoxy or a phenoxy.

Examples of the compound represented by Chemical Formula 3 include methyl aluminoxane, ethyl aluminoxane, isobutyl aluminoxane, tert-butyl aluminoxane, and the like, and a more preferable compound is methyl aluminoxane.

Examples of the compound represented by Chemical Formula 4 include trimethyl aluminum, triethyl aluminum, triisobutyl aluminum, tripropyl aluminum, tributyl aluminum, dimethylchloro aluminum, triisopropyl aluminum, tri-sec-butylaluminium, tricyclopentyl aluminium, tripentylaluminum, triisopentyl aluminum, trihexyl aluminum, trioctyl aluminum, ethyl dimethyl aluminum, methyl diethyl aluminum, triphenyl aluminum, tri-p-tolyl aluminum, dimethyl aluminum methoxide, dimethyl aluminum ethoxide, trimethyl boron, triethylboron, triisobutylboron, tripropylboron, tributylboron and the like, and more preferred compounds are selected from trimethylaluminum, triethylaluminum, and triisobutylaluminum.

Examples of the compound represented by Chemical Formula include triethylammonium tetraphenylboron, tributylammonium tetraphenylboron, trimethylammonium tetraphenylboron, tripropylammonium tetraphenylboron, trimethylammoniumtetra(p-tolyl)boron, trimethylammoniumtetra(o,p-dimethylphenyl)boron, tributylammonium tetra(p-trifluoromethylphenyl)boron, trimethylammonium tetra(p-trifluoromethylphenyl)boron, tributylammonium tetrapentafluorophenylboron, N,N-diethylanilinium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, triethylammonium tetraphenyl aluminum, tributylammonium tetraphenyl aluminum, trimethylammonium tetraphenyl aluminum, tripropylammonium tetraphenyl aluminum, trimethylammonium tetra(p-tolyl) aluminum, tripropylammonium tetra(p-tolyl) aluminum, triethylammonium tetra(o,p-dimethylphenyl) aluminum, tributylammonium tetra(p-trifluoromethylphenyl) aluminum, trimethylammonium tetra(p-trifluoromethylphenyl) aluminum, tributylammonium tetrapentafluorophenyl aluminum, N,N-diethylanilinium tetraphenyl aluminum, N,N-diethylanilinium tetrapentafluorophenyl aluminum, diethylammonium tetrapentafluorophenyl aluminum, triphenylphosphonium tetraphenyl aluminum, trimethylphosphonium tetraphenyl aluminum, tripropylammonium tetra (p-tolyl) boron, triethylammoniumtetra (o,p-dimethylphenyl) boron, tributylammonium tetra(p-trifluoromethylphenyl) boron, triphenylcarboniumtetra (p-trifluoromethylphenyl)boron, triphenylcarbonium tetrapentafluorophenylboron, and the like.

Such hybrid supported catalyst can be prepared, for example, by a method comprising the steps of: supporting a cocatalyst compound on a support, supporting the compound represented by Chemical Formula 1 on the support; and supporting the compound represented by Chemical Formula 2 on the support. The order of supporting can be changed as needed.

In the preparation of the hybrid supported catalyst, a hydrocarbon solvent such as pentane, hexane, heptane or the like or an aromatic solvent such as benzene, toluene or the like may be used as a reaction solvent. Further, the metallocene compound and the cocatalyst compound may be used in a form supported on silica or alumina.

In addition, the polypropylene of one embodiment can be produced by polymerizing propylene in the presence of the hybrid supported catalyst described above.

In the above method for producing a polypropylene, ethylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, and the like can be further used in addition to the propylene, and two or more types thereof can be mixed and copolymerized. Preferably, the polypropylene according to the invention is a propylene homopolymer, a random copolymer of propylene and ethylene, or a terpolymer of ethylene, propylene, and $C_{4-8}$ olefins (in particular 1-butene).

The polymerization reaction may be carried out by homopolymerization of one olefinic monomer or copolymerization of two or more monomers using one continuous slurry polymerization reactor, a loop slurry reactor, a gas phase reactor or a solution reactor.

The hybrid supported catalyst can be injected in a state of being dissolved or diluted in aliphatic hydrocarbon solvents having 5 to 12 carbon atoms such as pentane, hexane, heptane, nonane, decane, and isomers thereof, aromatic hydrocarbon solvents such as toluene and benzene, or a hydrocarbon solvent substituted with a chlorine atom such as dichloromethane, chlorobenzene, or the like. The solvent used here is preferably used by removing a small amount of water or air which acts as a catalyst poison by treating with a small amount of alkyl aluminum, and it can also be carried out by further using a cocatalyst.

Here, the polymerization may be carried out by reacting at a temperature of 25 to 500° C. and a pressure of 1 to 100 kgf/cm$^2$ for 1 to 24 hours. In this case, the polymerization reaction temperature is preferably 25 to 200° C., more preferably 50 to 100° C. The polymerization reaction pressure is preferably 1 to 70 kgf/cm$^2$, and more preferably 5 to 40 kgf/cm$^2$. The polymerization reaction time is preferably 1 to 5 hours.

The polymerization process can adjust the molecular weight range of the polymer product finally produced, depending on the conditions of the addition or non-addition of hydrogen. In particular, the high molecular weight polypropylene can be prepared under the conditions of not adding hydrogen. If hydrogen is added, the low molecular weight polypropylene can be prepared even with low hydrogen content. At this time, the amount of hydrogen to be added to the polymerization process can be in the range of 0.07 L to 4 L under reactor condition of 1 bar, or hydrogen can be supplied at a pressure of 1 bar to 40 bar or it can be supplied at 168 ppm to 8,000 ppm in the range of hydrogen molar content compared to olefinic monomer.

Since the polypropylene according to the present invention exhibits high transparency and a very low level of generation of volatile organic compounds, it can be used for products such as injection containers or beverage cups which can make direct contact with the human body.

DETAILED DESCRIPTION OF THE EMBODIMENTS

Hereinafter, the invention will be described in more detail by way of examples. However, these examples are given for illustrative purposes only and the scope of the present invention is not limited by the examples.

Preparation Example 1

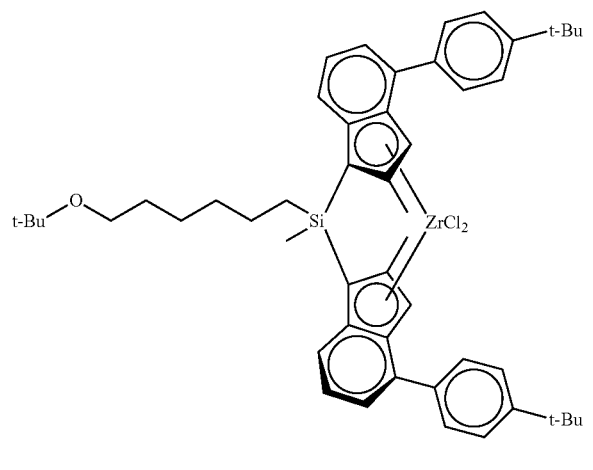

Step 1) Preparation of (6-t-butoxyhexyl)(methyl)-bis(2-methyl-4-tert-butyl-phenylindenyl)silane 2-Methyl-4-tert-butylphenyl indene (20.0 g, 76 mmol) was dissolved in a toluene/THF=10/1 solution (230 mL) and then n-butyllithium solution (2.5 M, hexane solvent, 22 g) was slowly added dropwise at 0° C. and then stirred at room temperature for one day. Then, (6-t-butoxyhexyl)dichloromethylsilane (1.27 g) was slowly added dropwise to the mixed solution at −78° C. After stirring for about 10 minutes, the mixture was stirred at room temperature for one day. Then, water was added to separate the organic layer, and the solvent was distilled under reduced pressure to obtain (6-t-butoxyhexyl)(methyl)-bis(2-methyl-4-tert-butyl-phenylindenyl)silane.

$^1$H NMR (500 MHz, CDCl$_3$, 7.26 ppm): −0.20-0.03 (3H, m), 1.26 (9H, s), 0.50-1.20 (4H, m), 1.20-1.31 (11H, m), 1.40-1.62 (20H, m), 2.19-2.23 (6H, m), 3.30-3.34 (2H, m), 3.73-3.83 (2H, m), 6.89-6.91 (2H, m), 7.19-7.61 (14H, m)

Step 2) Preparation of [(6-t-butoxyhexylmethylsilane-diyl)-bis(2-methyl-4-tert-butylphenylindenyl)]zirconium dichloride (6-t-butoxyhexyl)(methyl)-bis(2-methyl-4-tert-butyl-phenylindenyl)silane prepared in Step 1 was dissolved in a toluene/THF=5/1 solution, and then n-butyllithium solution (2.5 M, hexane solvent, 22 g) was slowly added dropwise thereto at −78° C. and stirred at room temperature for one day. Bis(N,N'-diphenyl-1,3-propanediamido)dichlorozirconium bis (tetrahydrofuran))[Zr(C$_5$H$_6$NCH$_2$CH$_2$NC$_5$H$_6$)Cl$_2$(C$_4$H$_8$O)$_2$] was dissolved in toluene (229 mL), and then slowly added dropwise to the reaction solution at −78° C., and the solution was stirred at room temperature for one day. After the reaction solution was cooled to −78° C., a HCl ether solution (1 M, 183 mL) was slowly added dropwise, and the solution was stirred at 0° C. for 1 hour. After filtration and vacuum drying, hexane was added and stirred to precipitate crystals. The precipitated crystals were filtered and dried under reduced pressure to obtain [(6-t-butoxyhexylmethylsilane-diyl)-bis(2-methyl-4-tert-butylphenylindenyl)]zirconium dichloride (20.5 g, total 61%)

$^1$H NMR (500 MHz, CDCl$_3$, 7.26 ppm): 1.20 (9H, s), 1.27 (3H, s), 1.34 (18H, s), 1.20-1.90 (10H, m), 2.25 (3H, s), 2.26 (3H, s), 3.38 (2H, t), 7.00 (2H, s), 7.09-7.13 (2H, m), 7.38 (2H, d), 7.45 (4H, d), 7.58 (4H, d), 7.59 (2H, d), 7.65 (2H, d)

Preparation Example 2

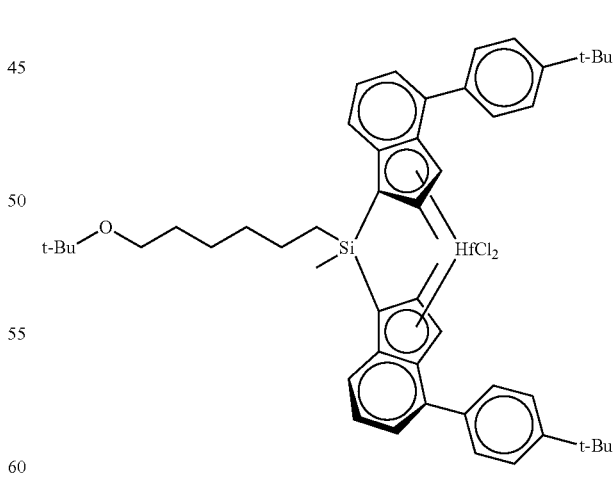

Step 1) Preparation of (6-t-butoxyhexyl)(methyl)-bis(2-methyl-4-(4-t-butylphenyl)indenyl)silane 150 g of 2-methyl-4-(4-t-butylphenyl)indene was added to a 3 L Schlenk flask and dissolved in toluene/THF (10:1, 1.73 L) solution at room temperature. After the above solution was cooled to −20° C., 240 mL of n-butyllithium solution (n-BuLi, 2.5 M in hexane) was slowly added dropwise and the solution was stirred at room temperature for 3 hours. Then, the reaction solution was cooled to −20° C. and then 82 g of (6-t-butoxyhexyl)dichloromethylsilane and 512 mg of CuCN were slowly added dropwise. The reaction solution was warmed up to room temperature, and then stirred for 12 hours, to which 500 mL of water was added. Then, the organic layer was separated, dehydrated with MgSO$_4$ and filtered. The filtrate was distilled under reduced pressure to obtain a desired compound in the form of a yellow oil.

$^1$H NMR (500 MHz, CDCl$_3$, 7.26 ppm): −0.09-−0.05 (3H, m), 0.40-0.60 (2H, m), 0.80-1.51 (26H, m), 2.12-2.36 (6H, m), 3.20-3.28 (2H, m), 3.67-3.76 (2H, m), 6.81-6.83 (2H, m), 7.10-7.51 (14H, m)

Step 2) Preparation of rac-[(6-t-butoxyhexylmethyl-silanediyl)-bis(2-methyl-4-(4-t-butylphenyl)inde-nyl)]hafnium dichloride (6-t-butoxyhexyl)(methyl)-bis(2-methyl-4-(4-t-butylphenyl)indenyl)silane previously prepared was added to a 3 L Schlenk flask, and 1 L of ethyl ether was added thereto and dissolved at room temperature. After the solution was cooled to −20° C., 240 mL of n-butyllithium solution (n-BuLi, 2.5 M in hexane) was slowly added dropwise, and the mixture was stirred at room temperature for 3 hours. Then, the reaction solution was cooled to −78° C., and 92 g of hafnium chloride was added thereto. The reaction solution was warmed up to room temperature and stirred for 12 hours, and the solvent was removed under reduced pressure. 1 L of dichloromethane was added, and then insoluble inorganic salts and the like were removed by filtration. The filtrate was dried under reduced pressure, and 300 mL of dichloromethane was added again to precipitate crystals. The precipitated crystals were filtered and dried to obtain 80 g of rac-[(6-t-butoxyhexylmethylsilanediyl)-bis(2-methyl-4-(4-t-butyl-phenyl)indenyl)]hafnium dichloride (Rac:meso=50:1).

$^1$H NMR (500 MHz, CDCl$_3$, 7.26 ppm): 1.19-1.78 (37H, m), 2.33 (3H, s), 2.34 (3H, s), 3.37 (2H, t), 6.91 (2H, s), 7.05-7.71 (14H, m)

Preparation Example 3—Preparation of Hybrid Supported Catalyst 3 g of silica L203F was pre-weighed into a Schlenk flask to which 10 mmol of methylaluminoxane (MAO) was added and then reacted at 95° C. for 24 hours. After precipitation, the upper layer was removed and washed once with toluene. 60 μmol of the compound prepared in Preparation Example 2 was dissolved in toluene and then reacted at 75° C. for 5 hours. After completion of the reaction, when the precipitation was completed, the upper layer solution was removed and the residual reaction product was washed once with toluene. 20 μmol of the compound prepared in Preparation Example 1 was dissolved in toluene and then further reacted at 75° C. for 2 hours. After completion of the reaction, when the precipitation was completed, the upper layer solution was removed and the residual reaction product was washed once with toluene. 64 μmol of dimethylanilinium tetrakis (pentafluorophenyl)borate was added and then reacted at 75° C. for 5 hours. After completion of the reaction, the reaction product was washed with toluene, washed again with hexane and dried under vacuum to obtain a silica-supported metallocene catalyst in the form of solid particles.

Example 1

A 2 L stainless steel reactor was dried under vacuum at 65° C. and then cooled, to which 1.5 mmol of triethylaluminum, 337 ppm of hydrogen and 770 g of propylene were added at room temperature. Then, after stirring for 10 minutes, 0.04 g of the supported catalyst prepared in Preparation Example 3 was dissolved in 20 mL of TMA-formulated hexane and added to the reactor under nitrogen pressure. Then, the reactor temperature was gradually increased to 70° C. and then allowed to polymerize for 1 hour. After completion of the reaction, unreacted propylene was vented.

Example 2

An olefin monomer was polymerized in the same manner as in Example 1, except that the amount of hydrogen added was changed to 200 ppm in Example 1.

Comparative Example 1

A 2 L stainless steel reactor was vacuum dried at 65° C., cooled, and then 1.5 mmol of triethylaluminum, 500 ppm of hydrogen and 770 g of propylene were added at room temperature. After stirring for 10 minutes, 0.01 g of Ziegler-Natta catalyst was dissolved in 20 mL of TMA-formulated hexane and added to the reactor under nitrogen pressure. Then, the reactor temperature was gradually elevated to 70° C., and polymerization was carried out for 1 hour. After completion of the reaction, unreacted propylene was vented.

Comparative Example 2

An olefin monomer was polymerized in the same manner as in Comparative Example 1, except that the amount of hydrogen added was changed to 725 ppm in Comparative Example 1.

Experimental Example

The following physical properties were measured for the polypropylene of Examples and Comparative Examples.

1) Mn, Mw, and MWD: A sample was pretreated with PL-SP260 in 1,2,4-trichlorobenzene containing 0.0125% BHT at 160° C. for 10 hours, and the number average molecular weight and the weight average molecular weight were measured using PL-GPC220 at the measurement temperature of 1600° C. The molecular weight distribution is expressed by a ratio of the weight average molecular weight to the number average molecular weight.

2) Melt Index (MFR, 2.16 kg): Measured at 230° C. under 2.16 kg load according to ASTM D 1238 and shown in weight (g) of the polymer obtained by melting for 10 minutes.

3) Melting point (Tm): The melting point of the polymer was measured using Differential Scanning Calorimeter (DSC, device name: DSC 2920, manufacturer: TA Instrument). Specifically, the polymer was heated up to 220° C. and then maintained at the same temperature for 5 minutes. After cooling to 20° C., the temperature was again increased. At this time, the increasing speed and the lowering speed of the temperature was adjusted to 10° C./min, respectively.

4) Tensile Strength: The tensile strength was measured according to ASTM D790.

5) Flexural modulus and flexural strength: Flexural modulus and flexural strength were measured according to ASTM D790.

6) Impact strength: After fixing a test specimen with V-Notch according to ASTM D256, the strength of the specimen required until the specimen was broken by applying a pendulum was measured at 23° C.

7) Haze: The degree (%) of refraction of light when light was shot to 1 T (1 mm) and 2 T (2 mm) of a test specimen in accordance with ASTM D1003 was measured. The haze value can be measured with Td (refracted light)/Tt (passed light)*100, and the transparency of the specimen can be evaluated.

8) Amount of Volatile Organic Compound Emission: TVOC (total volatile organic compounds) and VOC/FOG (volatile organic compounds/fogging) emissions were measured under the following conditions.

(1) VDA277

The olefin polymer was heated for 5 hours at 120° C. using headspace-GC-FID according to VDA 277 standardized by the German Association of the Automobile Industry, and all hydrocarbons detected per 1 g of sample was converted into the content (μg) of acetone.

Specifically, as shown in Equation 1 below, the integrated value (blank value) of the total peak area of hydrocarbons detected in an empty headspace vessel is subtracted from the integrated value of the total peak area of hydrocarbons detected from the sample, and then the obtained value was divided by the constant (k (G)) obtained from the acetone calibration. Then, the obtained value is multiplied by the weight ratio value (0.6204) of carbon between the standard amount of acetone used (2 μg of acetone per 1 g of sample) and the total weight of acetone, thereby determining the content (EG) in which hydrocarbons detected per 1 g of sample are converted into acetone.

The thus converted value is prescribed as the TVOC value and is shown in Table 2 below.

$$E_G = \frac{\text{Total peak area} - \text{Blank value}}{k(G)} \times 2 \times 0.6204 \qquad [\text{Equation 1}]$$

The thus converted value is prescribed as the VOC value and is shown in Table 2 below.

Meanwhile, the olefin polymer was heated at 120° C. for 1 hour using purge & trap-GC-MSD according to VDA 278 standardized by the German Association of the Automobile Industry, and hydrocarbons (n-C14~n-C32) detected per 1 g of sample was converted into the content (μg) of hexadecane. The thus converted value is prescribed as the FOG value and is shown in Table 2 below Specifically, as shown in Equation 2 below, the integrated value (peak area) of the total peak area of hydrocarbons detected from sample is divided by the content of sample used. Then, in the case of VOC, the obtained value is multiplied by Rf (response factor) of toluene, and in the case of FOG, by RF of hexadecane, and thereby hydrocarbons detected per 1 g of sample is converted into the content (μg) of toluene or hexadecane.

$$\text{Emission} = Rf(\text{toluene or hexadecane}) \times \frac{\text{Peak area}}{1000 \times \text{Test portion sample}} \qquad [\text{Equation 2}]$$

The measurement results are shown in Tables 1 and 2 below.

TABLE 1

| Physical property unit | Mw g/mol | Mn g/mol | Mw/Mn | MFR g/10 min | Tm ° C. |
|---|---|---|---|---|---|
| Example 1 | 131,600 | 41,100 | 2.9 | 21.7 | 144.0 |
| Example 2 | 145,000 | 38,000 | 2.8 | 13.5 | 144.0 |
| Comparative Example 1 | 153,000 | 26,100 | 5.9 | 16.0 | 148.4 |
| Comparative Example 2 | 125,300 | 21,700 | 5.8 | 28.8 | 148.6 |

TABLE 2

| | Physical property | | | | | | | |
|---|---|---|---|---|---|---|---|---|
| | Tensile strength | Flexural Modulus | Flexural Strength | Impact strength (23° C.) | Haze | TVOC (VDA277) | VOC (VDA278) | FOG (VDA278) |
| Unit | kgf/cm² | kgf/cm² | kgf/cm² | kg-cm/cm | % | μg/g | μg/g | μg/g |
| Example 1 | 324 | 15,071 | 433 | 4.5 | 4.6 | 27 | 15 | 18 |
| Example 2 | 327 | 16,200 | 462 | 4.7 | 4.4 | 31 | 18 | 20 |
| Comparative Example 1 | 311 | 13,200 | 374 | 5.2 | 6.0 | 183 | 260 | 275 |
| Comparative Example 2 | 300 | 12,650 | 359 | 4.8 | 5.2 | 192 | 285 | 302 |

(2) VDA278

The olefin polymer was heated for 30 minutes at 90° C. using purge & trap-GC-MSD according to VDA 278 according to VDA 278 standardized by the German Association of the Automobile Industry, and hydrocarbons (up to n-C25) detected per 1 g of sample was converted into the content (μg) of toluene.

As shown in Tables 1 and 2 above, the polypropylene of Examples produced in the presence of a hybrid supported catalyst comprising two types of metallocene compounds containing specific transition metals have not only superior mechanical properties such as flexural modulus and flexural strength but also very low volatile organic compound emissions and excellent transparency, as compared with the polypropylene of Comparative Examples produced in the presence of a Ziegler-indicated catalyst. Therefore, the polypropylene of Examples is advantageously applied to products such as injection containers or beverage cups which can make direct contact with a human body.

What is claimed is:

1. A polypropylene having a TVOC (total volatile organic compounds) value of 60 µg/g or less, which is measured according to VDA 277 standardized by the German Association of the Automobile Industry and means a value obtained by heating the polypropylene at 120° C. for 5 hours and converting all hydrocarbons detected per 1 g of the polypropylene into the content of acetone;
   having a haze of 5% or less;
   a weight average molecular weight of 100,000 to 145,000 g/mol; and
   a molecular weight distribution (Mw/Mn) of 2.9 or less.

2. The polypropylene of claim 1, wherein the polypropylene has a VOC (volatile organic compounds) value of 30 µg/g or less, which is measured according to VDA 278 standardized by the German Association of the Automobile Industry, and means a value obtained by heating the polypropylene at 90° C. for 30 minutes and converting straight chain hydrocarbons having 1 to 25 carbon atoms detected per 1 g of the polypropylene into the content of toluene.

3. The polypropylene of claim 1, wherein the polypropylene has a FOG (fogging) value of 40 µg/g or less, which is measured according to VDA 278 standardized by the German Association of the Automobile Industry, and means a value obtained by heating the polypropylene at 120° C. for 1 hour and converting straight chain hydrocarbons having 14 to 32 carbon atoms detected per 1 g of the polypropylene into the content of hexadecane.

4. The polypropylene of claim 1, wherein the polypropylene has a flexural strength (measured according to ASTM D790) of 400 kgf/cm² or more.

5. The polypropylene of claim 1, wherein the polypropylene has a melting point (Tm) of 130° C. to 145° C., and a flexural modulus (measured according to ASTM D790) of 14,000 kgf/cm² or more.

6. The polypropylene of claim 1, wherein the polypropylene has a MFR (measured at 230° C. under a load of 2.16 kg according to ASTM D1238) of 10 to 25 g/10 min.

7. The polypropylene of claim 1, wherein the polypropylene has a tensile strength (measured according to ASTM D790) of 300 to 400 kgf/cm².

8. The polypropylene of claim 1, wherein the polypropylene is produced by polymerizing propylene in the presence of a hybrid supported catalyst comprising a compound represented by the following Chemical Formula 1, a compound represented by the following Chemical Formula 2 and a support:

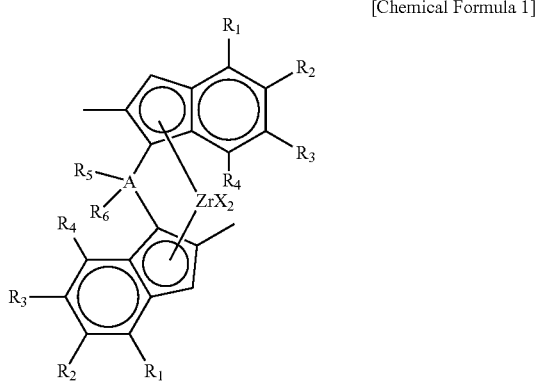

[Chemical Formula 1]

in Chemical Formula 1,
X is halogen, equal to or different from each other,
$R_1$ is $C_{6-20}$ aryl substituted with $C_{1-20}$ alkyl,
$R_2$, $R_3$ and $R_4$ are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silyl ether, $C_{1-20}$ alkoxy, $C_{6-20}$ aryl, $C_{7-20}$ alkylaryl, or $C_{7-20}$ arylalkyl,
A is carbon, silicon or germanium,
$R_5$ is $C_{1-20}$ alkyl substituted with $C_{1-20}$ alkoxy, and
$R_6$ is hydrogen, $C_{1-20}$ alkyl or $C_{2-20}$ alkenyl,

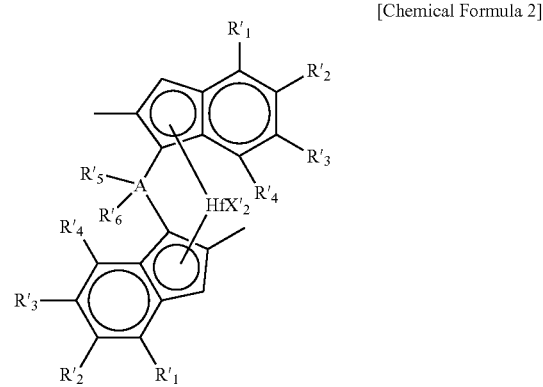

[Chemical Formula 2]

in Chemical Formula 2,
X' is halogen, equal to or different from each other,
$R'_1$ is $C_{6-20}$ aryl substituted with $C_{1-20}$ alkyl,
$R'_2$, $R'_3$ and $R'_4$ are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silyl ether, $C_{1-20}$ alkoxy, $C_{6-20}$ aryl, $C_{7-20}$ alkylaryl, or $C_{7-20}$ arylalkyl,
A' is carbon, silicon or germanium,
$R'_5$ is $C_{1-20}$ alkyl substituted with $C_{1-20}$ alkoxy, and
$R'_6$ is hydrogen, $C_{1-20}$ alkyl or $C_{2-20}$ alkenyl.

9. The polypropylene of claim 8, wherein the hybrid supported catalyst further includes at least one of the cocatalyst compounds represented by the following Chemical Formulas 3, 4 and 5, —[Al($R_{30}$)—O]$_m$—   [Chemical Formula 3]

in Chemical Formula 3,
$R_{30}$ is equal to or different from each other, and each independently represent a halogen; a hydrocarbonyl having 1 to 20 carbon atoms; or a hydrocarbonyl having 1 to 20 carbon atoms substituted with halogen; and
m is an integer of 2 or more;

J($R_{31}$)$_3$   [Chemical Formula 4]

in Chemical Formula 4,
$R_{31}$ is as $R_{30}$ defined in Chemical Formula 3;
J is aluminum or boron;

[E-H]⁺[ZA₄]⁻ or [E]⁺[ZA₄]⁻   [Chemical Formula 5]

in Chemical Formula 5,
E is a neutral or cationic Lewis base;
H is a hydrogen atom;
Z is a Group 13 element; and
A is equal to or different from each other, and each independently represents an aryl group having 6 to 20 carbon atoms or an alkyl group having 1 to 20 carbon atoms, in which one or more hydrogen atoms are substituted or unsubstituted with a halogen, a hydrocarbonyl having 1 to 20 carbon atoms, an alkoxy or a phenoxy.

* * * * *